United States Patent
De La Pena Razquin

(10) Patent No.: US 6,701,579 B1
(45) Date of Patent: Mar. 9, 2004

(54) DEVICE FOR CUTTING THE REMAINING LENGTH OF THE TONGUE OF A CLAMPING RING

(76) Inventor: Emmanuel Garcia De La Pena Razquin, Calle Cortes de Aragon, 46 4 Dcha., 50005 Zaragoza (ES)

(*) Notice: Subject to any disclaimer, the term of this patent is extended or adjusted under 35 U.S.C. 154(b) by 0 days.

(21) Appl. No.: 10/049,571

(22) PCT Filed: Aug. 30, 2000

(86) PCT No.: PCT/ES00/00332

§ 371 (c)(1),
(2), (4) Date: Feb. 14, 2002

(87) PCT Pub. No.: WO01/17874

PCT Pub. Date: Mar. 15, 2001

(30) Foreign Application Priority Data

Sep. 4, 1999 (ES) ................................ 9901987

(51) Int. Cl.⁷ .......................... B26B 27/00; B65D 63/00
(52) U.S. Cl. .................. 24/16 PB; 24/16 R; 24/17 AP; 24/30.5 P; 140/93.2
(58) Field of Search .............. 24/16 PB, 16 R, 24/17 AP, 305 P; 140/93.2

(56) References Cited

U.S. PATENT DOCUMENTS

| 3,014,506 A | * | 12/1961 | Crimmins et al. | 140/93.2 |
| 3,192,584 A | * | 7/1965 | Pape | 24/16 PB |
| 3,488,813 A | * | 1/1970 | Kohke | 24/19 PB |
| 3,739,430 A | * | 6/1973 | Kohke | 24/16 PB |
| 3,754,304 A | * | 8/1973 | Modrey | 24/901 |
| 3,892,011 A | | 7/1975 | Kohke | |
| 4,119,124 A | * | 10/1978 | Collier et al. | 140/93.2 |
| 4,866,816 A | * | 9/1989 | Caveney | 24/16 PB |
| 5,088,159 A | * | 2/1992 | Lafleur | 24/16 PB |
| 5,513,421 A | * | 5/1996 | Wells | 24/16 PB |

* cited by examiner

Primary Examiner—Victor Sakran
(74) Attorney, Agent, or Firm—Hunton & Williams LLP

(57) ABSTRACT

The disclosed device is intended to improve the cutting finish and reduce the time used to cut the remaining body portion after the standard cable tie has been finally tightened.

It comprises adding a blade in the cable tie head in order to cut the remaining body portion as a result of the torsion of said body portion.

It is applicable to any production process wherein the remaining body portion has to be removed by using a manual or automatic cutting tool.

6 Claims, 1 Drawing Sheet

DEVICE FOR CUTTING THE REMAINING LENGTH OF THE TONGUE OF A CLAMPING RING

RELATED APPLICATIONS

This application claims priority, under 35 U.S.C. §371, to PCT application No. PCT/ES00/00332, filed Aug. 30, 2000.

FIELD OF THE INVENTION

Current invention is applicable in several industrial fields where the standard cable ties have an extensive use as: car industry, home appliance machines, electrical facilities, pipe routings for water, air conditioning in buildings, etc.

STATE OF THE ART

There is no background of a cutting device incorporated to the head for removing the over length of a standard cable tie such as the ones patented on May 9, 1972 in the United States (U.S. Pat. No. 3,660,869) which is considered to be the closest prior art.

EXPLANATION

The current invention consisting of adding a blade to the head of the standard cable tie that enables to remove the remaining body portion by twisting it against the blade.

The blade must be one able to cut the plastic of the body portion without big effort. The blade class as the ones used in razor machines.

It is not needed a blade thickness nor a quality as high as the ones used in razor machines, since it will not be in contact with water and they will perform one single cut in their life cycle. Due to this, the cost of the blade can be cheaper.

The fixing of the blade to the head needs to be robust, it can be performed by a riveting or integrating it to the injection tooling itself.

Product main advantages:
1. Avoid the need of using a cutting tool for removing the body over length after the cable tie is tightened. This drives to a shorter assembly time, and to have one free hand for performing any other operation.
2. Improve the cut quality. In this way it is avoided the risk of injuries due to remaining withsharp edges, achieving an improved product or facility finishing.

DRAWING DESCRIPTION

Figure 1:
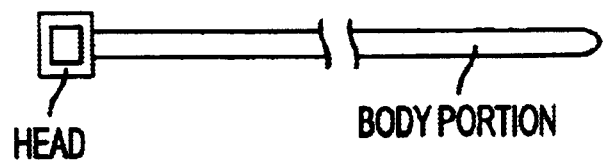

In FIG. 1 it can be seen a drawing of a untightened standard cable tie. This kind of cable ties have often incorporated a clip for fixing the wiring bundle or the pipe to a hole, for those the invention has also application.

Figure 2:
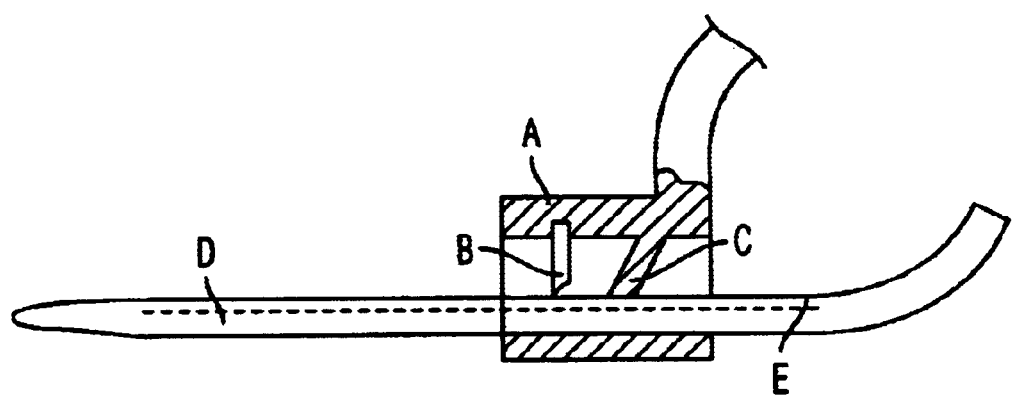

In FIG. 2 a section of the head can be seen where the following elements are remarked:
A. The head portion, it is the assembly that contains the locking means and the blade.
B. The blade, a metallic element that cuts the body over length when a torsion is applied to it.
C. The locking means an already incorporated part of the cable tie, its function is to avoid the cable tie to open once it is tightened. It works engaging among the body portion teeth.
D. The body portion, element part of the cable tie, bundles the elements that we want to tight
E. The teeth, that are belonging to the body portion and are avoiding the sliding of the locking means.

Figure 3:
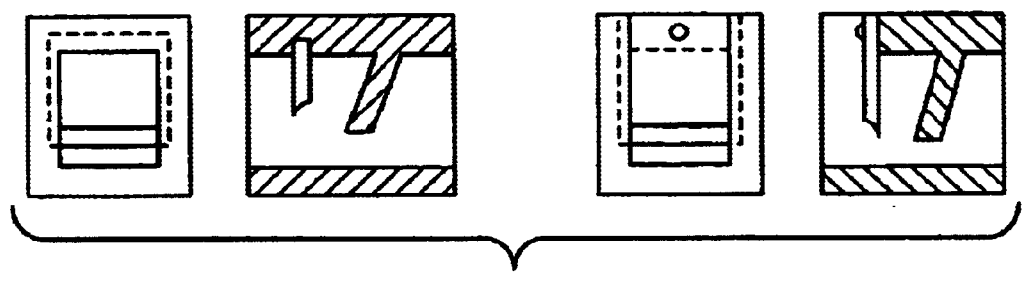

FIG. 3 is showing two examples of how the blade can be fixed to the head by a riveting operation or integrating it during the injection process.

INVENTION EMBODIMENT

The blade to the cable tie must be incorporated in an automatic process that will lead to a final product of low manufacturing cost.

There are several ways to fix a blade to plastic injected part. The industrial field where this operation is common is in the razor machines, where the more extensively used technique is to plastic rivet a pin, part of the head, that goes through an opening that the blade has (see FIG. 3).

Other technology is to incorporate the blade during the injection of the cable tie. To do so, a holder inside the tool is needed that will keep the blade in the needed. It is also possible to fix the blade to the head in a subsequent process, through an opening that the head has and with retention ribs to hold it inside the opening.

What is claimed is:
1. A cable tie comprising:
   a body portion with a longitudinal section of saw teeth and
   a head portion located at a first end of the body portion, the head portion having a hole suitable for introducing a second end of the body portion therethrough,
   the head portion also having a locking means made of plastic and formed by injection molding together with the body portion and the head portion,
   the locking means is formed to engage the longitudinal section of saw teeth to prevent the cable tie from opening once it is tightened,
   the cable tie further characterized in that the cable tie further comprises a blade located substantially on the same side of the head portion as the locking means and wherein the blade is positioned to cut the over length portion of the second end by pulling the over length portion into engagement with the blade after the second end has been passed through the hole and tightened.
2. A cable tie as defined in claim 1 wherein said blade is made of non metallic material.
3. A cable tie as defined in claim 1 wherein said blade is made of a metallic material.
4. A cable tie as defined in claim 1 wherein said blade is attached by plastic riveting, metallic riveting, gluing or screwing.
5. A cable tie as defined in claim 1 wherein said blade is inserted into the head portion at a time that occurs before, during or after the cable tie is formed by injection molding.
6. A cable tie as defined in claim 1 wherein the cable tie incorporates a fixing clip for attaching the cable tie to other structures.

* * * * *